US012359806B2

(12) United States Patent
Xiang et al.

(10) Patent No.: US 12,359,806 B2
(45) Date of Patent: Jul. 15, 2025

(54) CONTROL METHOD AND SYSTEM FOR SMALL PULVERIZED COAL SILO FEEDING

(71) Applicant: HUAZHONG UNIVERSITY OF SCIENCE AND TECHNOLOGY, Hubei (CN)

(72) Inventors: Jun Xiang, Hubei (CN); Ziya Wei, Hubei (CN); Wei Deng, Hubei (CN); Yiqing Yang, Hubei (CN); Hengda Han, Hubei (CN); Jun Su, Hubei (CN); Guangying Li, Hubei (CN); Yi Wang, Hubei (CN); Song Hu, Hubei (CN); Sheng Su, Hubei (CN); Long Jiang, Hubei (CN); Jun Xu, Hubei (CN); Kai Xu, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/861,580

(22) PCT Filed: May 23, 2024

(86) PCT No.: PCT/CN2024/094826
§ 371 (c)(1),
(2) Date: Oct. 30, 2024

(87) PCT Pub. No.: WO2025/081822
PCT Pub. Date: Apr. 24, 2025

(65) Prior Publication Data
US 2025/0122999 A1 Apr. 17, 2025

(30) Foreign Application Priority Data
Oct. 17, 2023 (CN) ........................ 202311340146.6

(51) Int. Cl.
*F23K 3/00* (2006.01)
*B02C 25/00* (2006.01)

(52) U.S. Cl.
CPC ................ *F23K 3/00* (2013.01); *B02C 25/00* (2013.01); *F23K 2203/002* (2013.01); *F23K 2203/008* (2013.01)

(58) Field of Classification Search
CPC ...................................................... B02C 25/00
See application file for complete search history.

(56) References Cited

U.S. PATENT DOCUMENTS

2010/0326337 A1 12/2010 Tsutsumi et al.

FOREIGN PATENT DOCUMENTS

CN 109681907 4/2019
CN 217540800 10/2022
(Continued)

OTHER PUBLICATIONS

"International Search Report (Form PCT/ISA/210) of PCT/CN2024/094826", mailed on Aug. 16, 2024, with English translation thereof, pp. 1-9.
(Continued)

*Primary Examiner* — Jason Lau
(74) *Attorney, Agent, or Firm* — JCIP GLOBAL INC.

(57) ABSTRACT

The present invention provides a coal feeding control method and system for a small pulverized coal silo, the method includes: acquiring a boiler load increase signal, and determining the target function F(t) for boiler load control obtaining the current coal mill output signal B(t), where B(t) is the fuel quantity signal at the outlet of the coal mill that changes over time from the start time; comparing B(t) with F(t): if B(t) cannot meet the fuel quantity requirements of F(t), activate the small pulverized coal silo connected to the boiler; otherwise, the small pulverized coal silo remains
(Continued)

inactive; determining the coal feeding signal f(t) for the small pulverized coal silo, and further determining the coal feeding control signal f(t) for the small pulverized coal silo; controlling the small pulverized coal silo to feed coal to the boiler, quickly changing the combustion rate in the furnace, and increasing the boiler load.

8 Claims, 9 Drawing Sheets

(56) References Cited

FOREIGN PATENT DOCUMENTS

| | | |
|---|---|---|
| CN | 115342373 | 11/2022 |
| CN | 116147010 | 5/2023 |
| CN | 116753515 | 9/2023 |
| CN | 117419357 | 1/2024 |
| JP | H01266401 | 10/1989 |
| JP | H04145957 | 5/1992 |
| JP | H05237413 | 9/1993 |

OTHER PUBLICATIONS

"Written Opinion of the International Searching Authority (Form PCT/ISA/237) of PCT/CN2024/094826", mailed on Aug. 16, 2024, with English translation thereof, pp. 1-8.

CONTROL METHOD AND SYSTEM FOR SMALL PULVERIZED COAL SILO FEEDING

CROSS-REFERENCE TO RELATED APPLICATION

This application is a 371 of international application of PCT application serial no. PCT/CN2024/094826, filed on May 23, 2024, which claims the priority benefit of China application serial no. 202311340146.6, filed on Oct. 17, 2023. The entirety of each of the above-mentioned patent applications is hereby incorporated by reference herein and made a part of this specification.

TECHNICAL FIELD

This invention pertains to the field of automatic control technology for flexible operation of power plant boilers, specifically involving the control method and system for feeding in small pulverized coal silos.

BACKGROUND TECHNOLOGY

Under the background of carbon neutrality, coal power will undergo a transformation from the main source of energy to the basic source of energy and then to the regulating source of energy.

For boilers with a direct-blow pulverized coal system, after receiving a load increase command, it must go through processes such as coal feeding, mixing, and grinding before the fuel can be sent into the furnace. The load response of the fuel system has a long cycle, while the combustion inside the furnace is instantaneous. After receiving the command, the combustion system control will have a significant delay.

At present, direct-blow boilers generally have a large delay time in the fuel control system and cannot quickly change the combustion rate in the furnace to adapt to changes in external load. The existing technology requires several minutes for coal to be ground by the pulverizer and then sent into the boiler for combustion. Although some studies have proposed improvements to the system structure, the small pulverized coal silo has limited load regulation effect in the process of rapid load increase, and it is prone to cause safety and environmental protection issues. It is difficult to further break through the bottleneck of the rapid and precise dynamic matching between the fuel system and the combustion system in the process of rapid peak load adjustment of coal-fired power plant boilers.

INVENTION CONTENT

This invention is conducted to address the aforementioned issues, with the aim of providing a control method and system for small pulverized coal silo feeding. It accurately controls the process of the small pulverized coal silo delivering coal powder to the furnace during the load increase, quickly changes the combustion rate within the furnace, and precisely and dynamically adapts to changes in external load.

To achieve the above objectives, this invention adopts the following scheme:

Method

The invention provides a control method for feeding coal powder in a small pulverized coal silo, used in a direct-blow pulverized coal system, which includes the following steps:

Step 1: Acquire the boiler load increase signal, and the small pulverized coal silo feeding control system is initiated. Based on this signal, determine the target function F(t) for boiler load control, where t represents the time series. This time series is defined with the initiation time of the small pulverized coal silo feeding control system as the zero point, and the end point of the time interval for the load increase is determined by $t_{end}=\Delta P/\Delta p$. Here, ΔP is the amount of load increase for a single event, Δp is the target load increase rate, and F(t) is the time function of the boiler fuel signal.

Step 2: Obtain the current coal mill output signal B(t), where B(t) is the signal of the fuel quantity at the outlet of the coal mill that varies with time from the start of the system.

Step 3: Compare B(t) with F(t): If B(t) cannot meet the fuel quantity requirements of F(t), proceed to Steps 4 and 5 to activate the small pulverized coal silo connected to the boiler; otherwise, the small pulverized coal silo remains inactive.

Step 4: Determine the coal feeding signal f(t) for the small pulverized coal silo based on the difference between F(t) and B(t), and further determine the coal feeding control signal f(t) for the small pulverized coal silo.

Step 5: Control the small pulverized coal silo to feed coal to the boiler according to the coal feeding control signal f(t), quickly changing the combustion rate in the furnace and increasing the boiler load.

Specifically, the coal feeding control method for the small pulverized coal silo provided by this invention, in Step 2, involves conducting a pre-experiment to determine the output test of the coal mill's inlet and outlet to obtain the functional relationship between B(t) and t. Thereafter, based on the current time and the signals from the coal mill, coal feeder, and primary air flow at the current time, the current coal mill output signal B(t) is calculated and obtained.

Preferably, the coal feeding control method for the small pulverized coal silo provided by this invention, in Step 2, defines B(t) as a piecewise function, with each segment's functional form determined by $c_{m0}+c_{m1}t+c_{m2}t^2+ \ldots +c_{mn}t^n$. Here, the number of segments m and the coefficients $c_{m0}$, $c_{m1}$, $c_{m2} \ldots c_{mn}$, as well as the degree n of each segment, are determined through experimentation. For example, through experimentation, B(t) is determined to be a two-segment function. The first segment function is $B_1(t)=c_{10}+c_{11}t+c_{12}t^2$, corresponding to the time interval $[t_{a0}, t_{a1}]$. The second segment function is $B_2(t)=c_{20}+c_{21}t+c_{22}t^2+c_{23}t^3+c_{24}t^4$, corresponding to the time interval $(t_{a1}, t_{a2}]$. During the time interval from ta0 to ta1, the first segment function is used to calculate the output power, and during the time interval from $t_{a1}$ to $t_{a2}$, the second segment function is used to calculate the output power.

Preferably, the coal feeding control method for the small pulverized coal silo provided by this invention, in Step 2, involves the number of segments m and the coefficients $c_{m0}$, $c_{m1}$, $c_{m2} \ldots c_{mn}$, as well as the degree n of each segment, which are related to the coal mill speed, the amount of coal in the coal mill, the primary air flow, the coal feeder coal supply, and the delay time of the pulverizing system. By changing these parameters to obtain experimental data, the values of the undetermined constants are determined by substituting them into the formula. This forms an empirical database that associates the coal mill output signal with the current time signals of the coal mill, coal feeder, and primary air flow. By accessing the pre-established database with the current time signal, B(t) can be quickly calculated.

Preferably, the coal feeding control method for the small pulverized coal silo provided by this invention, in Step 4, revises f(t) to obtain f(t); the revision objectives include: ensuring that the primary coal pipe velocity is sufficient to prevent blockages and meets the air-fuel ratio, preventing the small pulverized coal silo's dedicated burners or the burners fed by the small pulverized coal silo from being extinguished or burning the burner tips, ensuring that the feeder can achieve and adapt to the feeding rate of f(t), and guaranteeing efficient and low-nitrogen combustion in the boiler; the revision process is as follows: based on f(t), calculate the primary coal pipe velocity, determine the operating state of the small pulverized coal silo's dedicated burners or the burners fed by the small pulverized coal silo, and generate a revision factor μ; obtain the feeder's rotation speed, determine the working state of the feeder, and generate a revision factor λ; obtain the boiler's combustion state, including boiler load, boiler water wall temperature, and the content of $O_2$, $SO_2$, $NO_x$, CO in the boiler, and generate a revision factor ψ; then, obtain the small pulverized coal silo coal feeding control signal f(t)=μλψf(t), and based on f(t), determine the final executable coal feeding rate for the small pulverized coal silo.

Preferably, in the coal feeding control method for the small pulverized coal silo provided by this invention, both f(t) and f(t) are functions that first increase and then decrease. The coal feeding amount from the small pulverized coal silo first increases and then gradually decreases. When the coal mill output signal B(t) can meet the target load change rate or when the load increase process is completed, the output of the small pulverized coal silo becomes zero, and the small pulverized coal silo stops feeding coal, waiting to receive the next load increase command. This approach can more accurately and efficiently match the load increase process.

Preferably, in the coal feeding control method for the small pulverized coal silo provided by this invention, in Step 5, the fuel quantity and coal transport air quantity of the small pulverized coal silo are calculated based on the coal feeding control signal f(t). The fuel quantity signal of the small pulverized coal silo is introduced into the boiler feedwater control subsystem, and the coal transport air quantity signal is introduced into the boiler air supply control subsystem. This ensures that the boiler maintains an appropriate water-coal ratio and air-coal ratio when supplying water and air, even when the small pulverized coal silo is feeding coal.

Preferably, the coal feeding control method for the small pulverized coal silo provided by this invention includes a small pulverized coal silo fuel control unit and a small pulverized coal silo air supply control unit. The small pulverized coal silo fuel control unit is relatively independent from the boiler feedwater control subsystem but is also coupled with it. The small pulverized coal silo air supply control unit is relatively independent from the boiler air supply (including primary, secondary, and tertiary air) and induced draft control subsystems but is also coupled with them. The small pulverized coal silo fuel control unit sends the fuel quantity signal of the small pulverized coal silo to the boiler feedwater control subsystem, and the small pulverized coal silo air supply control unit sends the coal transport air quantity signal to the boiler air supply and induced draft control subsystems. When the small pulverized coal silo is operating, the coupling channel between the small pulverized coal silo fuel control unit and the boiler feedwater control subsystem is open, and the coupling channel between the small pulverized coal silo air supply control unit and the boiler air supply and induced draft control subsystems is open. When the small pulverized coal silo is not operating, both the fuel and air supply control units are closed, and the coupling channels with the boiler subsystems are also closed, not participating in the boiler combustion process. After the boiler receives a load increase command, it is simultaneously passed to the boiler main control and the small pulverized coal silo, and the small pulverized coal silo control system is activated. The various subsystems of the boiler mentioned in the text are all existing parts of the original direct-blow pulverized coal system.

<System>

Further, the invention also provides a small pulverized coal silo feeding control system for use in a direct-blow pulverized coal system, capable of automatically implementing the aforementioned <method>, including:

Load Increase Target Acquisition Unit, which acquires the boiler load increase signal, initiates the small pulverized coal silo feeding control system, and determines the target function F(t) for boiler load control based on the boiler load increase signal. Here, t represents the time series, which starts at the time when the small pulverized coal silo feeding control system is activated (considered as the zero point), and the end point of the time series $t_{end}$ is determined by the interval of the load increase, calculated as $t_{end}=\Delta P/\Delta p$, where ΔP is the amount of load increase per event, Δp is the target load increase rate, and F(t) is the time function of the boiler fuel signal.

Coal Mill Output Acquisition Unit, which obtains the current coal mill output signal B(t), where B(t) is the fuel quantity signal at the outlet of the coal mill that changes over time from the start time.

Comparison and Judgment Unit, which compares B(t) with F(t): if B(t) cannot meet the fuel quantity requirements of F(t), it is determined that the small pulverized coal silo connected to the boiler should operate, and the Coal Feeding Information Determination Unit and Coal Feeding Execution Unit need to be activated; otherwise, it is determined that the small pulverized coal silo does not operate, and the Coal Feeding Information Determination Unit and Coal Feeding Execution Unit are not activated.

Coal Feeding Information Determination Unit, which determines the coal feeding signal f(t) for the small pulverized coal silo based on the difference between F(t) and B(t), and further determines the coal feeding control signal f(t) for the small pulverized coal silo.

Coal Feeding Execution Unit, which controls the small pulverized coal silo to feed coal to the boiler according to the coal feeding control signal f(t), quickly changing the combustion rate in the furnace and increasing the boiler load.

Control Unit, which is communicatively connected to the Load Increase Target Acquisition Unit, Coal Mill Output Acquisition Unit, Comparison and Judgment Unit, Coal Feeding Information Determination Unit, and Coal Feeding Execution Unit, and controls their operation.

Preferably, the small pulverized coal silo feeding control system provided by this invention may also include:

Input and Display Unit, which is communicatively connected to the Control Unit, used for allowing the user to input operational commands and for corresponding display.

Preferably, in the small pulverized coal silo feeding control system provided by this invention, in the Coal Mill Output Acquisition Unit, B(t) is a piecewise function, with each segment's functional form determined by $c_{m0}+c_{m1}t+c_{m2}t^2+\ldots+c_{mn}t^n$; here, the number of segments m and the coefficients $c_{m0}$, $c_{m1}$, $c_{m2}\ldots c_{mn}$, as well as the degree n of each segment, are determined through experimentation; the Coal Feeding Execution Unit determines the fuel quantity, coal transport air quantity, and feeding rate of the small pulverized coal silo based on f(t), and adjusts the rotation speed of the small pulverized coal silo's impeller feeder and the opening of the small pulverized coal silo's coal transport air door in real-time; the Control Unit includes a small pulverized coal silo master controller, a small pulverized coal silo fuel control unit, and a small pulverized coal silo air supply control unit.

ATTACHED IMAGE DESCRIPTION

Figure 10:
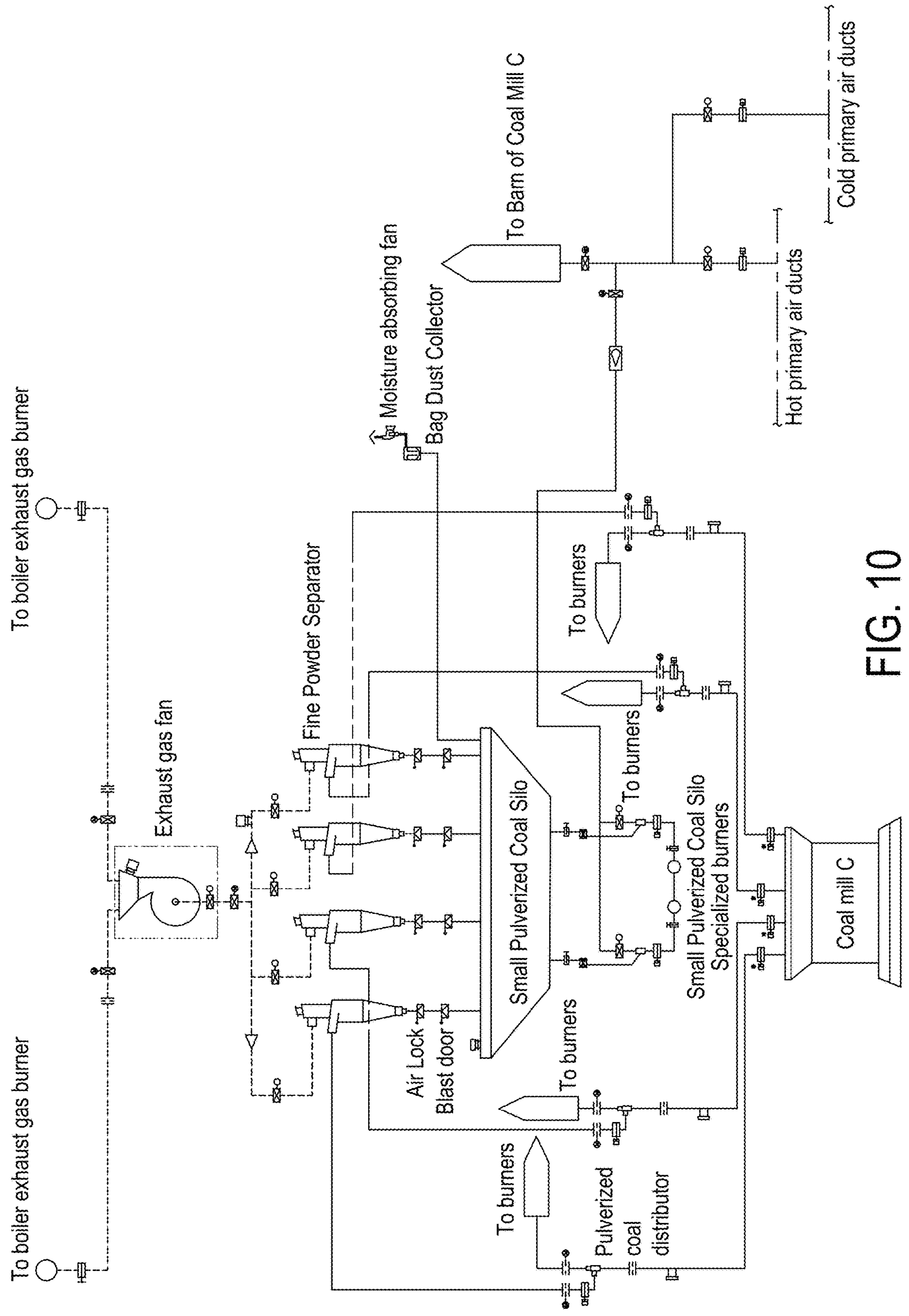

FIG. 10 is a schematic diagram of the structure and connection relationships of the small pulverized coal silo involved in the application example of the present invention (only the content related to the small pulverized coal silo is shown, and most of the existing technical structures in the original pulverizing system are omitted). In the figure, a1 represents the connection to the C mill burner, and a2 represents the connection to the E mill small pulverized coal silo, where C mill and E mill respectively refer to different coal mills.

EMBODIMENT

The following is a detailed description of the specific implementation of the coal feeding control method and system for the small pulverized coal silo involved in the present invention, in conjunction with the accompanying drawings.

Implementation Example 1

Figure 1:
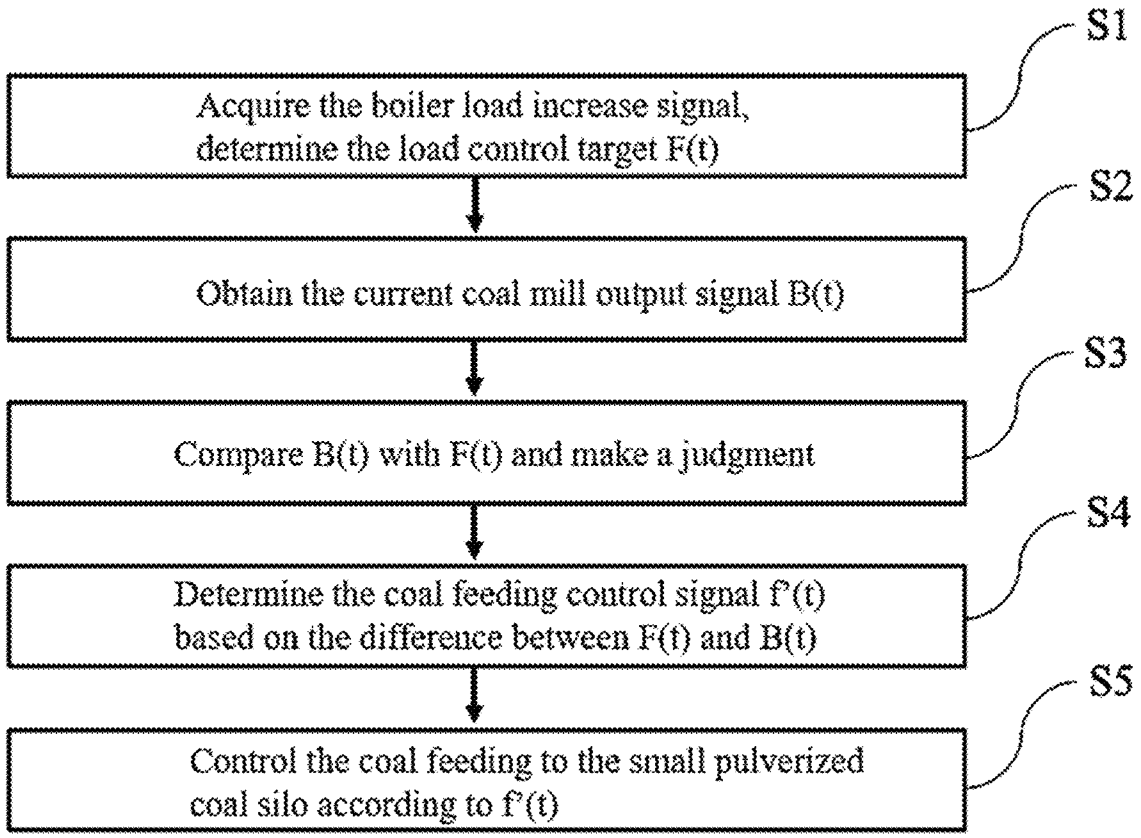
FIG. 1 is a flowchart of the coal feeding control method for the small pulverized coal silo involved in the first embodiment of the present invention.
Figure 2:
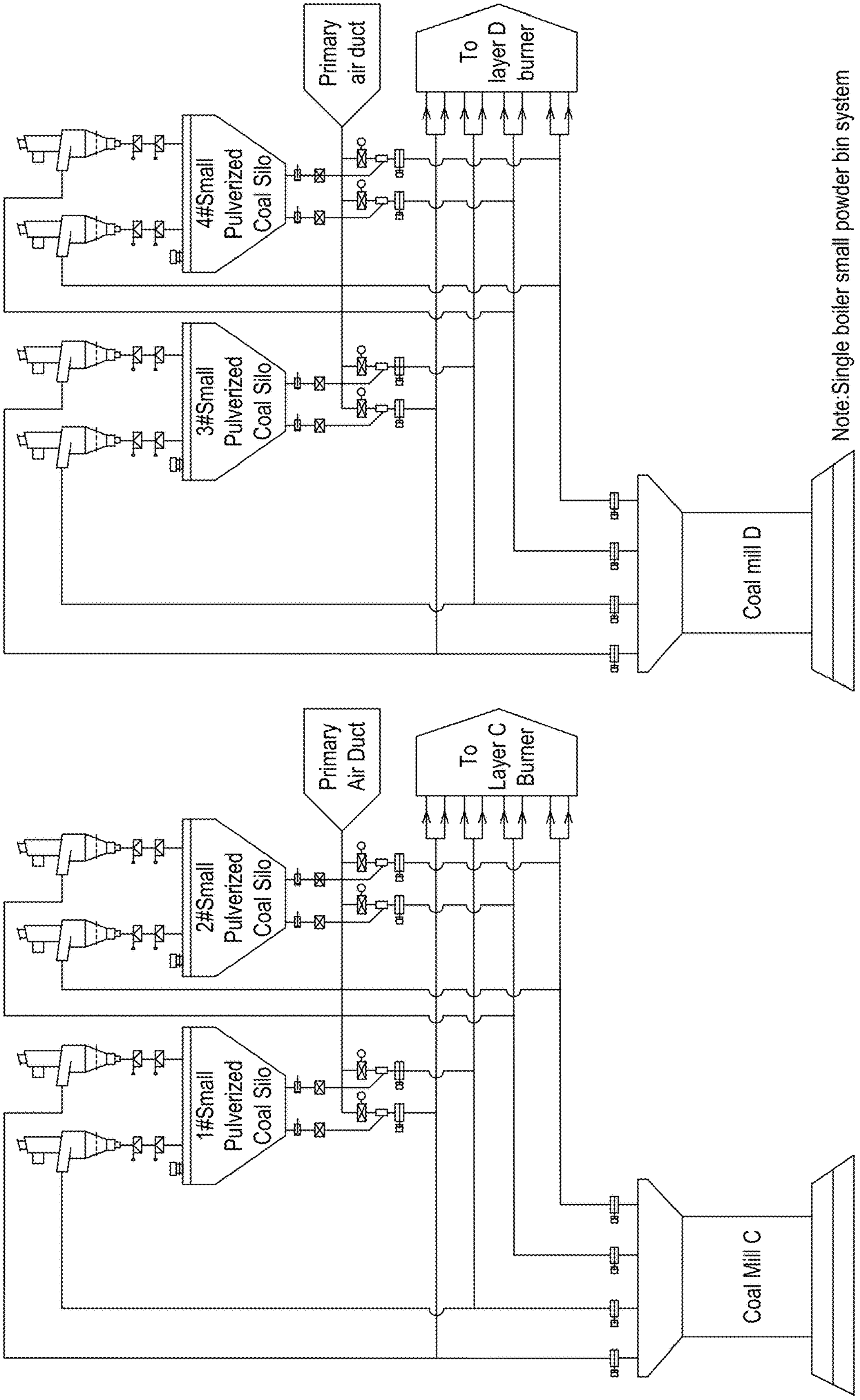
FIG. 2 is a schematic diagram of the structure and connection relationships of the small pulverized coal silo involved in the first embodiment of the present invention (only the content related to the small pulverized coal silo is shown, and most of the existing technical structures in the original pulverizing system are omitted).

As shown in FIG. 2, in this implementation example, a coal storage branch pipe is connected to the small pulverized coal silo system at the coal powder pipeline outlet of the C and D coal mills of the original boiler pulverizing system. The coal powder from the small pulverized coal silo is fed through the coal powder pipeline into the C and D coal mill powder pipelines, and then enters the C and D layer burners for combustion. There is no dedicated burner for the small pulverized coal silo, and the system uses the coal feeding control method provided by the present invention. The specific steps are as follows:

Step 1: Acquire the boiler load increase signal (load increase command), and the small pulverized coal silo coal feeding control system is initiated. Based on this signal, determine the target function F(t) for boiler load control, where t represents time (as a time series), with t defined as to at the start time of the small pulverized coal silo coal feeding control system. The end point of the time series $t_1$ is determined by the time interval of the load increase, $t_{end}=\Delta P/\Delta p$, in minutes, where $\Delta P$ is the amount of load increase per event, in MW, $\Delta p$ is the target load increase rate, in MW/min, and F(t) is the time function of the boiler fuel signal. The boiler load and fuel signal are matched, and the load change rate and the rate of change of the fuel signal are matched. Only the boiler load increase signal can be converted into a start signal for the small pulverized coal silo coal feeding control system through a signal filter and logical calculation.

The boiler increases its load from the current load rate to the expected load rate at the target load increase rate, and the single load increase process of the boiler is completed. The single load increase amount of the boiler refers to the difference between the expected load rate and the current load rate during a single load increase process. The target function for boiler load control, $F(t)\approx at+b$, represents the relationship between the fuel required by the boiler and time during a single load increase process, where a and b are constants obtained based on the single load increase amount, target load change rate, and fuel information.

In a direct-blow pulverized coal system, the boiler master control is the central control of the entire system, where the boiler fuel control subsystem is responsible for controlling the supply and use of fuel; the boiler combustion control subsystem is responsible for controlling the actual combustion process. The small pulverized coal silo coal feeding control system, as an additional auxiliary control system, is communicatively connected to the boiler master control, and the load increase signal from the boiler master control is simultaneously transmitted to the boiler fuel control subsystem and the small pulverized coal silo coal feeding control system.

Step 2: Obtain the current coal mill output signal B(t), which is the fuel quantity signal at the outlet of the coal mill that changes over time from the start time. The functional relationship between B(t) and t is obtained through pre-experiments on the coal mill inlet and outlet output, and the current coal mill output signal B(t) is calculated based on the current time and the current coal mill signal, coal feeder signal, and primary air flow signal.

In this implementation example, B(t) is a piecewise function, with each segment's functional form determined by $c_{m0}+c_{m1}t+c_{m2}t^2+ \dots +c_{mn}t^n$; here, the number of segments m and the coefficients $c_{m0}$, $c_{m1}$, $c_{m2}$ . . . $c_{mn}$, as well as the degree n of each segment, are determined through experimentation; t is defined as to at the start time of the small pulverized coal silo coal feeding control system, and the end point of the time series $t_1$ is determined by the time interval of the load increase, with the same value range as F(t). The number of segments m and the coefficients $c_{m0}$, $c_{m1}$, $c_{m2}$ . . . $c_{mn}$, as well as the degree n of each segment and the time segment range, are related to the coal feeder coal supply, coal mill speed, coal quantity in the coal mill, primary air flow, wind temperature, pressure difference between the inlet and outlet, and the delay time of the pulverizing system. By changing these parameters to obtain experimental data, the values of the undetermined constants are determined by substituting them into the formula, forming an empirical database that associates the coal mill output signal with the current time signals of the coal mill, coal feeder, and primary air flow. By accessing the pre-established database with the current time signal, B(t) can be quickly calculated.

Step 3: Compare B(t) with F(t): if B(t) cannot meet the fuel quantity requirements of F(t), proceed to Steps 4 and 5 to activate the small pulverized coal silo connected to the boiler; otherwise, the small pulverized coal silo remains inactive.

As shown in FIG. 2, in this implementation example, the small pulverized coal silo is connected to the boiler through the C and D coal mill powder pipelines without changing the original structure of the boiler. A coal storage branch pipe is connected to the small pulverized coal silo by setting up a coal storage branch pipe at the outlet of the coal mill's primary air powder pipeline. When the small pulverized coal silo is not feeding coal, the off-gas from the fine powder separator is burned in the off-gas wind dedicated burner, and a total of 2 off-gas wind dedicated burners are set up, which are arranged in the middle layer burner position on the left and right walls. During the coal feeding condition of the small pulverized coal silo, the primary air introduced from the front cold and hot primary air headers is mixed with the coal powder from the small pulverized coal silo outlet in the coal powder mixer, and then sent into the C and D coal mill powder pipelines to be burned together with the coal mill outlet coal powder in the C and D layer burners. The total volume of the small pulverized coal silo is large enough to achieve continuous two 25% load increases for a single boiler.

Step 4: Determine the coal feeding signal f(t) for the small pulverized coal silo based on the difference between F(t) and B(t), and further determine the coal feeding control signal f(t) for the small pulverized coal silo.

In Step 4, f(t) is revised to obtain f(t); the revision objectives include: ensuring that the primary coal pipe velocity is sufficient to prevent blockages and meets the air-fuel ratio, preventing the small pulverized coal silo's dedicated burners or the burners fed by the small pulverized coal silo from being extinguished or burning the burner tips, ensuring that the feeder can achieve and adapt to the coal feeding rate of f(t), and guaranteeing efficient and low-nitrogen combustion in the boiler.

The revision process is as follows: based on f(t), calculate the primary coal pipe velocity, determine the operating state of the small pulverized coal silo's dedicated burners or the burners fed by the small pulverized coal silo, and generate a revision factor μ; obtain the feeder's rotation speed, determine the working state of the feeder, and generate a revision factor λ; obtain the boiler's combustion state, including boiler load, boiler water wall temperature, and the content of $O_2$, $SO_2$, $NO_x$, CO in the boiler, and generate a revision factor ψ; then, obtain the small pulverized coal silo coal feeding control signal $f(t)=\mu\lambda\psi f(t)$, and based on f(t), determine the final executable coal feeding rate for the small pulverized coal silo.

Both f(t) and f(t) are functions that first increase and then decrease, with a maximum value point, meaning that the coal feeding amount from the small pulverized coal silo first increases and then gradually decreases. When the coal mill output signal B(t) can meet the target load change rate or when the load increase process is completed, the output of the small pulverized coal silo becomes zero, and the small pulverized coal silo stops feeding coal, waiting to receive the next load increase command.

Step 5: Control the small pulverized coal silo to feed coal to the boiler according to the coal feeding control signal f(t), quickly changing the combustion rate in the furnace and increasing the boiler load.

The beneficial effects of this scheme are as follows:

This invention first acquires the boiler load increase signal and calculates the corresponding target function F(t), with $t=\Delta P/\Delta p$. Then, it obtains the fuel quantity signal at the outlet of the coal mill that changes over time from the start time as the current coal mill output signal B(t). It compares B(t) with F(t), and when B(t) cannot meet the requirements of F(t), it determines that the small pulverized coal silo should assist the original direct-blow pulverized coal system in feeding coal. Based on the difference between F(t) and B(t), it determines the coal feeding signal f(t) for the small pulverized coal silo, and further determines the time-dynamically changing coal feeding control signal f(t) for the small pulverized coal silo. By using f(t), the small pulverized coal silo feeds coal to the boiler, quickly changing the combustion rate in the furnace and precisely and dynamically increasing the boiler load. The delay is reduced to within one minute, significantly enhancing the dynamic response capability of the pulverizing process to the load increase signal.

Additionally, this invention does not impede the coal fuel control process of the original pulverizing system, nor does it stop the coal feeding process of the original system. It simply adds an extra coal feeding control to the small pulverized coal silo on the basis of the original pulverizing system's coal feeding. Through the special coal feeding control method of the small pulverized coal silo, it assists in resolving the issues of large delay times in the original boiler fuel control process, the inability to quickly change the combustion rate in the furnace, and the adaptation to external load changes. This invention addresses the bottleneck problem of significant lag in the control of the fuel subsystem of power plant boilers when receiving load adjustment flexibility commands, significantly enhances the response speed of the combustion subsystem of the power plant boiler, and meets the demand for a rapid increase in fuel quantity after receiving variable load commands, as well as the need for rapid dynamic and precise matching between the fuel subsystem and the combustion subsystem.

Calculate the fuel quantity and coal transport air quantity of the small pulverized coal silo based on the coal feeding control signal f(t), and introduce the fuel quantity signal of the small pulverized coal silo into the boiler feedwater control subsystem, and introduce the coal transport air quantity signal into the boiler air supply control subsystem, ensuring that the boiler maintains an appropriate water-coal ratio and air-coal ratio when supplying water and air, even when the small pulverized coal silo is feeding coal.

The coal feeding control signal f(t) controls the coal feeding of the small pulverized coal silo impeller feeder (real-time adjustment of the small pulverized coal silo impeller feeder speed, controlling the amount of fuel entering the boiler as needed), and generates a fuel quantity signal introduced into the boiler feedwater control subsystem. On the other hand, it controls the coal transport air door opening to control the coal transport air quantity through the air-coal cross-limitation control and generates an air quantity signal introduced into the boiler air supply control subsystem.

The small pulverized coal silo coal feeding control system includes a small pulverized coal silo fuel control unit and a small pulverized coal silo air supply control unit; the small pulverized coal silo fuel control unit is relatively independent from the boiler feedwater control subsystem but is also coupled with it; the small pulverized coal silo air supply control unit is relatively independent from the boiler air supply and induced draft control subsystems but is also coupled with them; the small pulverized coal silo fuel control unit sends the fuel quantity signal of the small pulverized coal silo to the boiler feedwater control subsystem, and the small pulverized coal silo air supply control unit sends the coal transport air quantity signal to the boiler air supply and induced draft control subsystems.

When the small pulverized coal silo is operating, the coupling channel between the small pulverized coal silo fuel control unit and the boiler feedwater control subsystem is open, and the coupling channel between the small pulverized coal silo air supply control unit and the boiler air supply and induced draft control subsystems is open; when the small pulverized coal silo is not operating, the coupling channels between the small pulverized coal silo and the boiler subsystems are all closed, and it does not participate in the boiler combustion process, without affecting the original fuel supply and combustion control process of the boiler. The original system always maintains its normal operation, and the small pulverized coal silo only works to assist in coal feeding in specific situations; there is no situation where the small pulverized coal silo works while the original system's pulverizing, coal feeding, and other equipment do not work.

Figure 3:
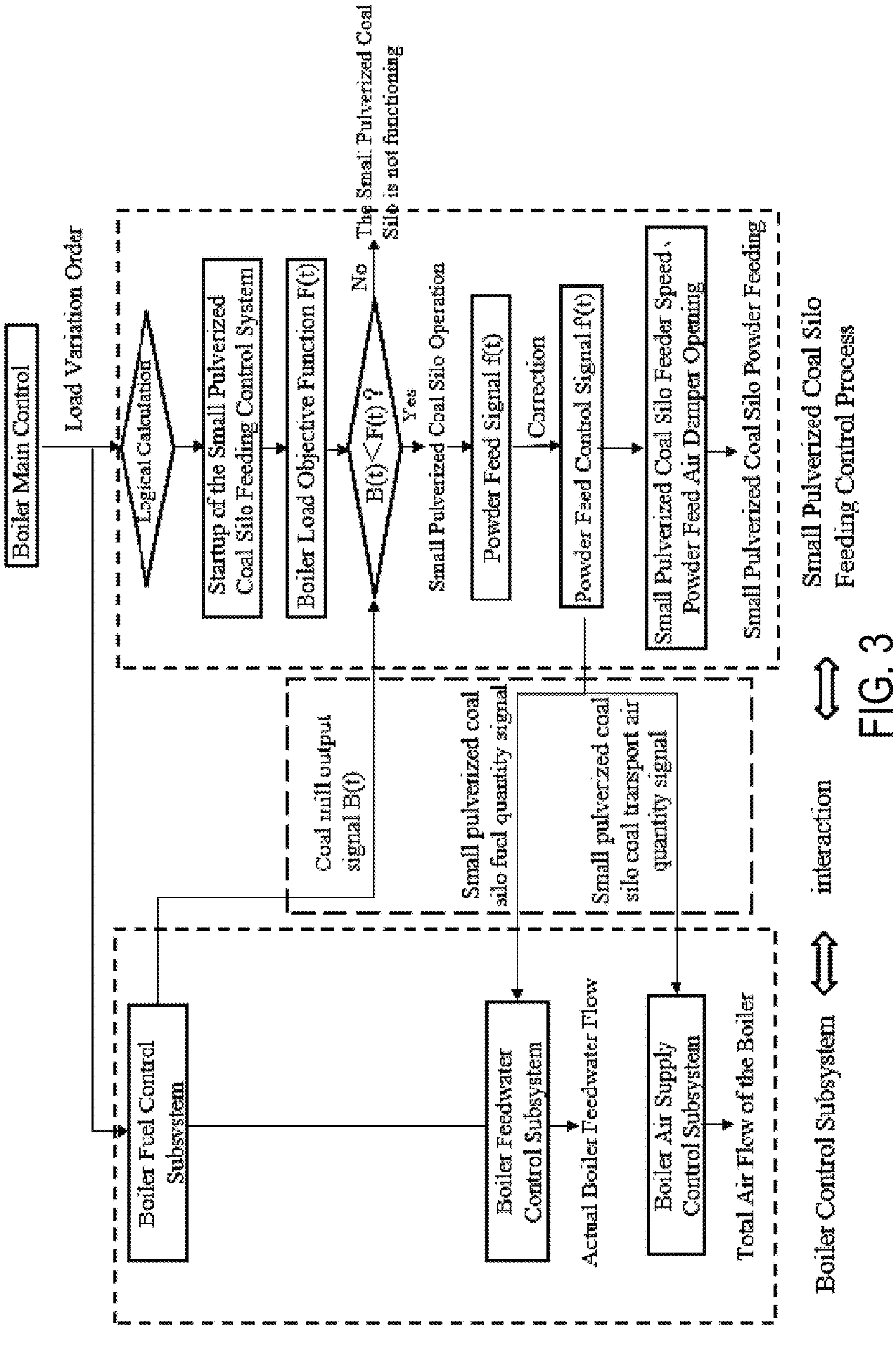
FIG. 3 is a schematic diagram of the information interaction (coupling) process between the coal feeding control process of the small pulverized coal silo involved in the first embodiment of the present invention and the boiler control subsystem.

As shown in FIG. 3, the boiler feedwater control subsystem controls the actual boiler water supply based on the sum of the fuel quantity signal output by the boiler fuel control subsystem and the fuel quantity signal output by the small pulverized coal silo coal feeding control unit; the boiler air supply control subsystem controls the actual boiler air volume based on the fuel quantity signal output by the boiler fuel control subsystem and the coal transport air quantity signal output by the small pulverized coal silo coal feeding control unit.

Compared with the most advanced existing technologies, the present invention can achieve a rapid increase in the amount of coal powder entering the furnace within 20-30 seconds and can achieve a maximum load change rate close to 6% pe/min, while Existing Technology 1 (CN116147010A—A boiler system that achieves flexible deep peak shaving) and Existing Technology 2 (CN115342373A-A flexible mixed coal powder supply system based on online monitoring of coal flow and coal quality) both require more than one minute to achieve a rapid increase in the amount of coal powder and can achieve a maximum load change rate of 2% pe/min.

Implementation Example 2

Figure 4:
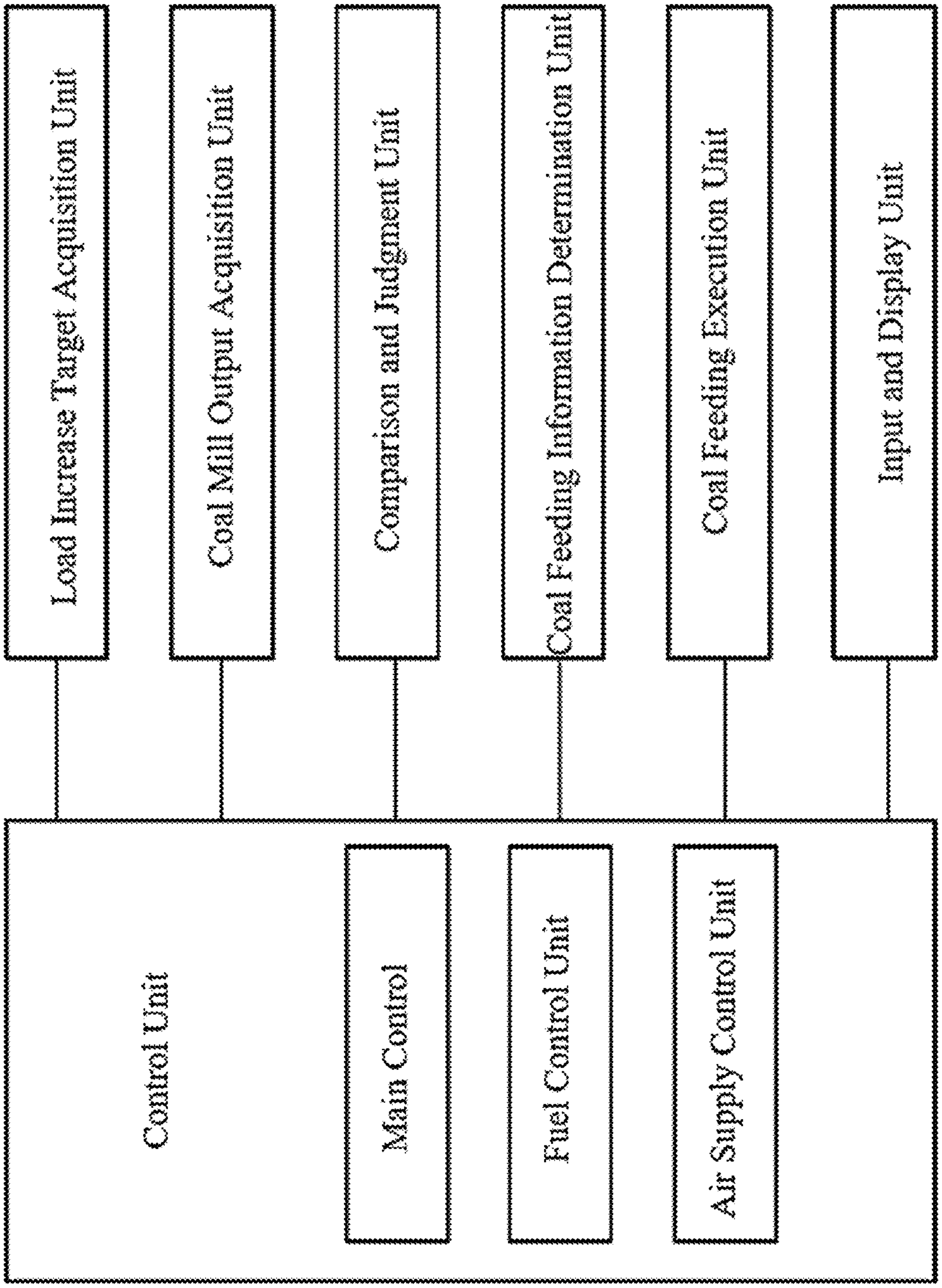
FIG. 4 is a structural block diagram of the coal feeding control system for the small pulverized coal silo involved in the second embodiment of the present invention.
Figure 9:
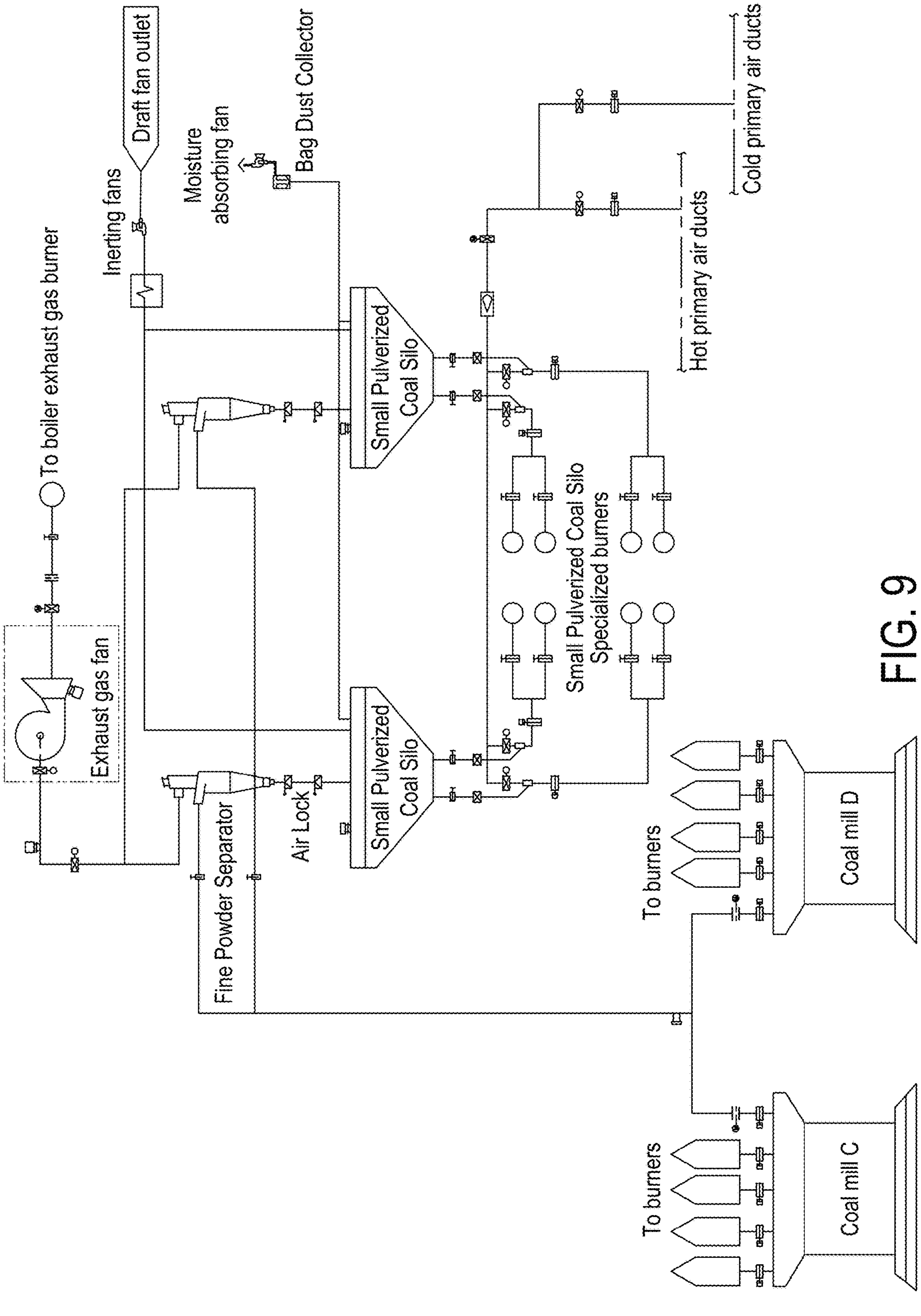
FIG. 9 is a schematic diagram of the structure and connection relationships of the small pulverized coal silo involved in the second embodiment of the present invention (only the content related to the small pulverized coal silo is shown, and most of the existing technical structures in the original pulverizing system are omitted).

In this implementation example, independent powder outlets are set up at the C and D mills of the original boiler pulverizing system to connect to the small pulverized coal silo system (suitable for new units), and eight dedicated burners for the small pulverized coal silo are correspondingly set up on the upper part of the middle layer burners of the boiler (as shown in FIG. 9). Additionally, a small pulverized coal silo coal feeding control system is provided that can automatically implement the method of the present invention, as shown in FIG. 4. The system includes a load increase target acquisition unit, a coal mill output acquisition unit, a comparison and judgment unit, a coal feeding information determination unit, a coal feeding execution unit, an input and display unit, and a control unit.

The load increase target acquisition unit performs the tasks described in step 1 of the aforementioned content, acquiring the boiler load increase signal and determining the target function F(t) for boiler load control based on that signal.

The coal mill output acquisition unit performs the tasks described in step 2 of the aforementioned content, obtaining the current coal mill output signal B(t).

The comparison and judgment unit performs the tasks described in step 3 of the aforementioned content, comparing B(t) with F(t): if B(t) cannot meet the fuel quantity requirements of F(t), it is determined that the small pulverized coal silo connected to the boiler should operate, and the coal feeding information determination unit and coal feeding execution unit need to be activated; otherwise, it is determined that the small pulverized coal silo does not operate, and the coal feeding information determination unit and coal feeding execution unit are not activated.

The coal feeding information determination unit performs the tasks described in step 4 of the aforementioned content, determining the coal feeding signal f(t) for the small pulverized coal silo based on the difference between F(t) and B(t), and further determining the coal feeding control signal f(t) for the small pulverized coal silo.

The coal feeding execution unit performs the tasks described in step 5 of the aforementioned content, controlling the small pulverized coal silo to feed coal to the boiler according to the coal feeding control signal f(t), quickly changing the combustion rate in the furnace and increasing the boiler load.

The input and display unit is used for the user to input operational commands and can display the input, output, and processing procedures of each unit according to specific operational commands.

The control unit is communicatively connected to the load increase target acquisition unit, coal mill output acquisition unit, comparison and judgment unit, coal feeding information determination unit, small pulverized coal silo coal feeding unit, and input and display unit, controlling their operation. The control unit includes a small pulverized coal silo master controller, a small pulverized coal silo fuel control unit, and a small pulverized coal silo air supply control unit. The control functions of the small pulverized coal silo fuel control unit and small pulverized coal silo air supply control unit are as described in Implementation Example 1, and the small pulverized coal silo master controller executes the remaining control functions to control the operation of each unit.

This implementation example provides a more integrated and automated system for controlling the coal feeding process of the small pulverized coal silo, which can be particularly useful in new installations where the necessary modifications to the boiler system can be made during construction. The dedicated burners for the small pulverized coal silo allow for more precise control of the combustion process, ensuring efficient and low-nitrogen combustion. The system's various units work together to ensure that the boiler responds quickly and accurately to load increase signals, improving the overall flexibility and efficiency of the boiler operation.

Application Implementation Example

In this application implementation example, a 350 MW unit is retrofitted with a new small pulverized coal silo system built between the C and E mills and the C and E layer burners. Two small pulverized coal silos are set up for each boiler, connected to the pulverized coal pipeline at the mill outlet through coal powder branch pipes. The mill is designed with four coal powder outlets, connected to four powder pipes, and the boiler is equipped with four small pulverized coal silo dedicated burners installed at the upper burner positions on the back wall (as shown in FIG. 10).

Brief introduction to the small pulverized coal silo system of the unit: Taking the C mill as an example, coal powder distributors and coal powder branch pipes leading to the small pulverized coal silo are set up on the four coal powder pipelines behind the C mill outlet separator. Electric adjustable throttles are set on the coal powder pipelines and branch pipes after the coal powder distributor, and pneumatic slide gates are set on the branch pipes near the outlet of the coal powder distributor. Each primary air branch pipe is sequentially connected to a fine powder separator, a conical lock hopper, and a small pulverized coal silo, with the C mill coal powder pipeline system correspondingly equipped with one small pulverized coal silo, a fine powder separator, and a conical lock hopper. Each small pulverized coal silo is designed with a capacity of 16 $m^3$. The two small pulverized coal silos are symmetrically arranged in front of the C layer distributor on the coal powder pipeline above. A coal feeding pipe is set at the outlet of each small pulverized coal silo, connecting to the corresponding coal powder pipeline of the C mill. Each coal feeding pipe is arranged from top to bottom with a rotor feeder, a pneumatic slide gate, and connected to a coal powder mixer. Under the coal feeding condition of the small pulverized coal silo, primary air from the front cold and hot primary air headers is mixed with coal powder from the small pulverized coal silo outlet in the coal powder mixer and then sent to the corresponding small pulverized coal silo dedicated burners for combustion. Under the coal storage condition of the small pulverized coal silo, the off-gas from the fine powder separator is sent to the boiler off-gas burner by the off-gas fan. Both the small pulverized coal silo and the off-gas fan are equipped with explosion doors. In addition, the small pulverized coal silo is equipped with a dehumidification drying system, a fire protection inertization system, a trace heating and insulation system, and an automatic control system that can be connected to the DCS (including the small pulverized coal silo coal feeding control system). The aforementioned systems, equipment, pipelines, and supporting slide gates, wind doors, pipeline supports, and insulation paint together form the small pulverized coal silo system.

Figure 8:
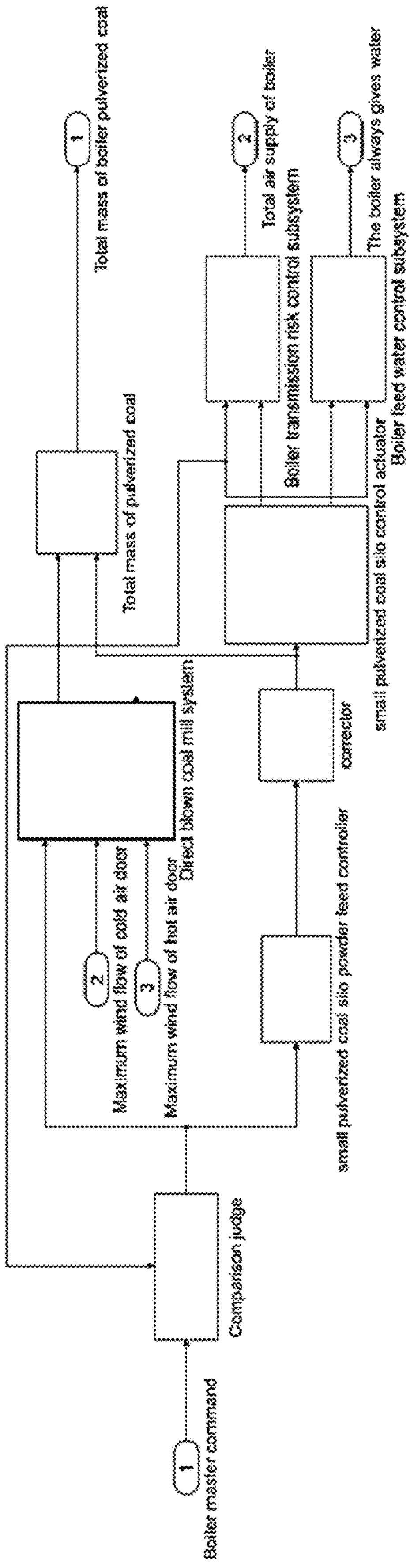
FIG. 8 is a schematic diagram of the coal feeding control system for the small pulverized coal silo involved in the application example of the present invention.

Taking the 350 MW unit as an example, which increases from 50% load rate to 75% load rate, according to the small pulverized coal silo coal feeding control system model (as shown in FIG. 8), the small pulverized coal silo coal feeding control method provided by the present invention is used, and the specific steps are as follows:

Step 1: Acquire the boiler load increase signal (load increase command), and the small pulverized coal silo coal feeding control system is initiated. Based on this signal, determine the target function F(t) for boiler load control, where t represents time (as a time series), with t defined as to at the start time of the small pulverized coal silo coal feeding control system. The end point of the time series t1 is determined by the time interval of the load increase, $t_{end}=\Delta P/\Delta p$, in minutes, where ΔP is the amount of load increase per event, in MW, Δp is the target load increase rate, in MW/min, and F(t) is the time function of the boiler fuel signal. The boiler load and fuel quantity signals are matched, and the load change rate and the rate of change of the fuel quantity signal are matched. Only the boiler load increase signal can be converted into a start signal for the small pulverized coal silo coal feeding control system through a signal filter and logical calculation. The single load increase amount ΔP is 25% pe, the target load increase rate Δp is 5% pe/min, and $t_{end}=\Delta P/\Delta p=5$ min=300 s.

The boiler increases its load from the current load rate to the expected load rate at the target load increase rate, and the single load increase process of the boiler is completed. The single load increase amount of the boiler refers to the difference between the expected load rate and the current load rate during a single load increase process. The target function for boiler load control, F(t)≈at+b, represents the relationship between the fuel required by the boiler and time during a single load increase process, where a and b are constants obtained based on the single load increase amount, target load change rate, and fuel information.

Taking a 350 MW unit as an example, which increases from 50% load rate to 75% load rate, the single load increase amount is 25% pe, and the target load change rate is 5% pe/min. The fuel consumption of the boiler at BMCR conditions is 168t/h. According to the aforementioned conditions, the target function for boiler load control, F(t), is expressed as follows:

$$F(t) \approx 7/720t + 35/6$$

F(t) represents the relationship between the fuel required by the boiler and time from the start time during this load increase process, in kg/s.

In a direct-blow pulverized coal system, the boiler master control is the central control of the entire system, where the boiler fuel control subsystem is responsible for controlling the supply and use of fuel; the boiler combustion control subsystem is responsible for controlling the actual combustion process. The small pulverized coal silo coal feeding control system, as an additional auxiliary control system, is communicatively connected to the boiler master control, and the load increase signal from the boiler master control is simultaneously transmitted to the boiler fuel control subsystem and the small pulverized coal silo coal feeding control system.

Step 2: Obtain the current coal mill output signal B(t), which is the fuel quantity signal at the outlet of the coal mill that changes over time from the start time. The functional relationship between B(t) and t is obtained through pre-experiments on the coal mill inlet and outlet output, and the current coal mill output signal B(t) is calculated based on the current time and the current coal mill signal, coal feeder signal, and primary air flow signal.

In this implementation example, B(t) is a piecewise function, with each segment's functional form determined by $c_{m0}+c_{m1}t+c_{m2}t^2+ \ldots +c_{mn}t^n$; here, the number of segments m and the coefficients $c_{m0}$, $c_{m1}$, $c_{m2} \ldots c_{mn}$, as well as the degree n of each segment, are determined through experimentation; t is defined as to at the start time of the small pulverized coal silo coal feeding control system, and the end point of the time series $t_{end}$ is determined by the time interval of the load increase, with the same value range as F(t). The number of segments m and the coefficients $c_{m0}$, $c_{m1}$, $c_{m2}$ . . . $c_{mn}$, as well as the degree n of each segment and the time segment range, are related to the coal mill speed, coal quantity in the coal mill, primary air flow, primary air temperature, coal feeder coal supply, coal powder moisture content at the coal mill outlet, and the delay time of the pulverizing system. By changing these parameters to obtain experimental data, the values of the undetermined constants are determined by substituting them into the formula, forming an empirical database that associates the coal mill output signal with the current time signals of the coal mill, coal feeder, and primary air flow. By accessing the pre-established database with the current time signal, B(t) can be quickly calculated. In this implementation example, the expression for B(t) is as follows:

$$B(t) = \begin{cases} \frac{35}{6} \\ \frac{7t}{1800} + 3.15 \end{cases}$$

B(t) represents the relationship between the fuel quantity at the coal mill outlet and time from the start time, in kg/s.

Figure 5:
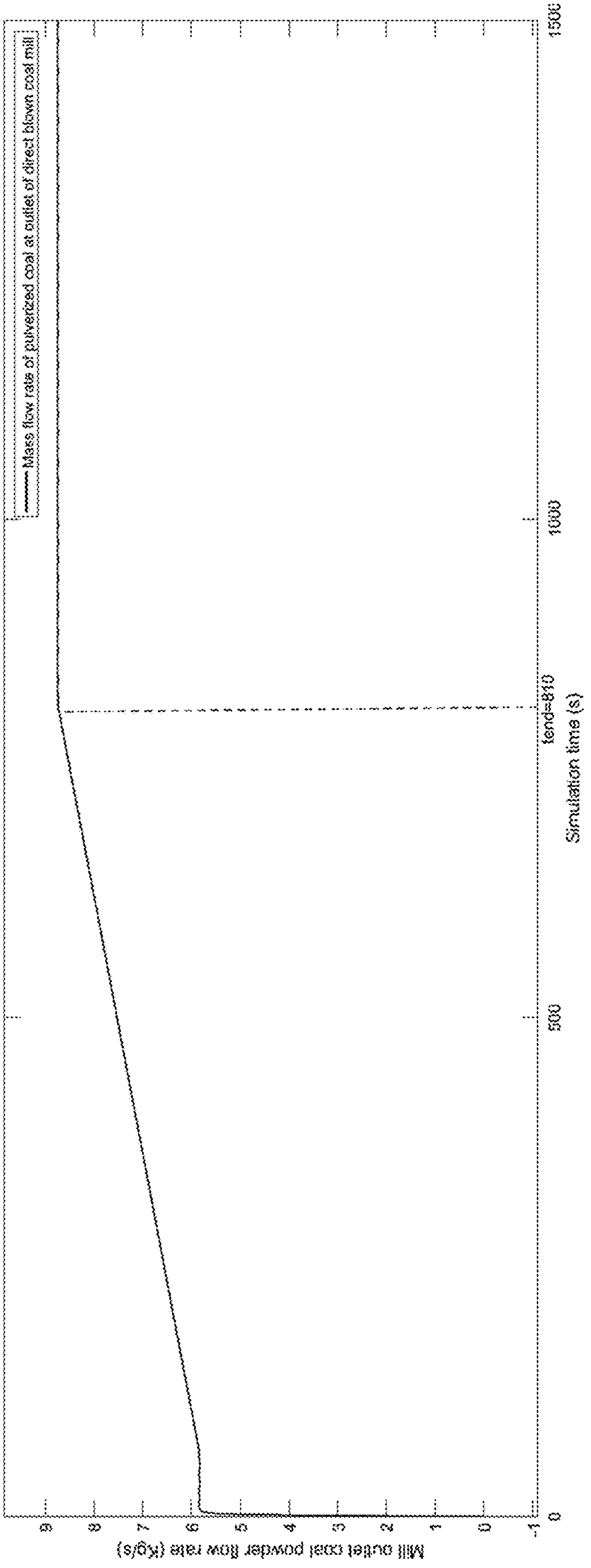
FIG. 5 is a trend chart showing the variation of B(t) with time t in the application example of the present invention.

When the small pulverized coal silo is not operating, the control system has a delay of 1 minute after the unit receives the load increase command, and the maximum output of the coal mill can only ensure a load increase rate of 2% pe/min for the boiler, which cannot achieve the 5% pe/min load increase command of the boiler master control. The fuel quantity entering the boiler is equal to the fuel quantity at the mill outlet. The simulation result is shown in FIG. 5, which is the trend chart of B(t) versus time t.

The beneficial effects of this preferred technical solution are as follows:

For the first time, this invention proposes a computational formula for B(t), which can reasonably and effectively reflect the variation relationship of B(t) with t. This allows for a more precise determination of the calculated value of B(t), and consequently, a more accurate determination of f(t) and f(t). It enables a response to the load increase signal within half a minute, typically achieving a rapid increase in the amount of coal powder entering the furnace within 20 to 30 seconds.

The beneficial effects of this preferred technology are: by conducting experiments that consider the variations in the coal feeder's coal supply, the amount of load increase per event, the amount of coal in the coal mill, the primary air flow and temperature, the pressure difference across the mill, and the delay time of the pulverizing system, the coefficient values can be determined more accurately.

Figure 6:
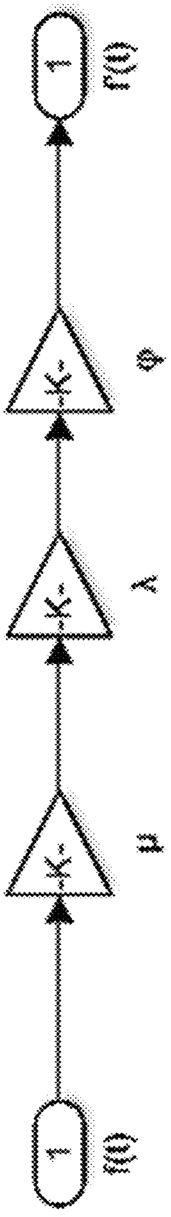
FIG. 6 is a flowchart illustrating the process of revising f(t) to f(t) in the application example of the present invention.

FIG. 6 shows a schematic diagram of the coal mill model control system built through an empirical database.

Step 3: Compare B(t) with F(t): if B(t) cannot meet the fuel quantity requirements of F(t), proceed to Steps 4 and 5 to activate the small pulverized coal silo connected to the boiler; otherwise, the small pulverized coal silo remains inactive.

As shown in FIG. 2, in this implementation example, the small pulverized coal silo is connected to the boiler and has independent dedicated burners for the small pulverized coal silo, without changing the original structure of the boiler. A coal storage branch pipe is connected to the small pulverized coal silo by setting up a coal storage branch pipe at the outlet of the coal mill's primary air powder pipeline. When the small pulverized coal silo is not feeding coal, the off-gas from the fine powder separator is burned in the off-gas wind dedicated burner, and a total of 2 off-gas wind dedicated burners are set up, which are arranged in the middle layer burner positions on the left and right walls. During the coal feeding condition of the small pulverized coal silo, the primary air introduced from the front cold and hot primary air headers is mixed with the coal powder from the small pulverized coal silo outlet in the coal powder mixer and then sent to the dedicated burners for the small pulverized coal silo for combustion. There are 4 dedicated burners for the small pulverized coal silo, arranged at the upper burner positions on the back wall, ensuring stable and effective combustion of the coal powder from the small pulverized coal silo. The total volume of the small pulverized coal silo is large enough to achieve continuous two 25% load increases for a single boiler.

Step 4: Determine the coal feeding signal f(t) for the small pulverized coal silo based on the difference between F(t) and B(t), and further determine the coal feeding control signal f(t) for the small pulverized coal silo.

In Step 4, f(t) is revised to obtain f(t); the revision objectives include: ensuring that the powder pipe velocity is sufficient to prevent blockages and meets the air-fuel ratio, preventing the dedicated burners for the small pulverized coal silo from being extinguished or burning the burner tips, ensuring that the feeder can achieve and adapt to the coal feeding rate of f(t), and guaranteeing efficient and low-nitrogen combustion in the boiler.

The revision process of f(t) to f(t) is as follows: based on f(t), calculate the primary powder pipe velocity, determine the operating state of the dedicated burners for the small pulverized coal silo, and generate a revision factor μ; obtain the feeder's rotation speed, determine the working state of the feeder, and generate a revision factor λ; obtain the boiler's combustion state, including boiler load, boiler water wall temperature, and the content of $O_2$, $SO_2$, $NO_x$, CO in the boiler, and generate a revision factor ψ; then, obtain the small pulverized coal silo coal feeding control signal f(t)=μλψf(t), and based on f(t), determine the final executable coal feeding rate for the small pulverized coal silo. FIG. 6 shows a flowchart for revising f(t) to f(t), and the expression for the revised f(t) is as follows:

$$f'(t) = \begin{cases} \frac{7}{720}t \\ \frac{7}{1200}t + \frac{7}{30} \\ -\frac{7}{1800}t + 3.15 \end{cases}$$

f(t) represents the relationship between the revised coal feeding amount of the small pulverized coal silo and time from the start time, in kg/s.

Both f(t) and f(t) are functions that first increase and then decrease, with a maximum value point, meaning that the coal feeding amount from the small pulverized coal silo first increases and then gradually decreases. When the coal mill output signal B(t) can meet the target load change rate or when the load increase process is completed, the output of the small pulverized coal silo becomes zero, and the small pulverized coal silo stops feeding coal, waiting to receive the next load increase command.

The beneficial effects of this preferred technology are: the revised f(t) can further ensure that the air pipe does not block the coal powder and that the air-fuel ratio is appropriate, the small pulverized coal silo's dedicated burners or the burners fed by the small pulverized coal silo will not be extinguished or burn the burner tips, the feeder can achieve and adapt to the feeding rate, and guarantee efficient and low-nitrogen combustion in the boiler. By correcting the small pulverized coal silo's coal feeding amount, air supply, boiler feedwater, and wind volume, the entire system can operate safely, stably, economically, and environmentally.

Figure 7:
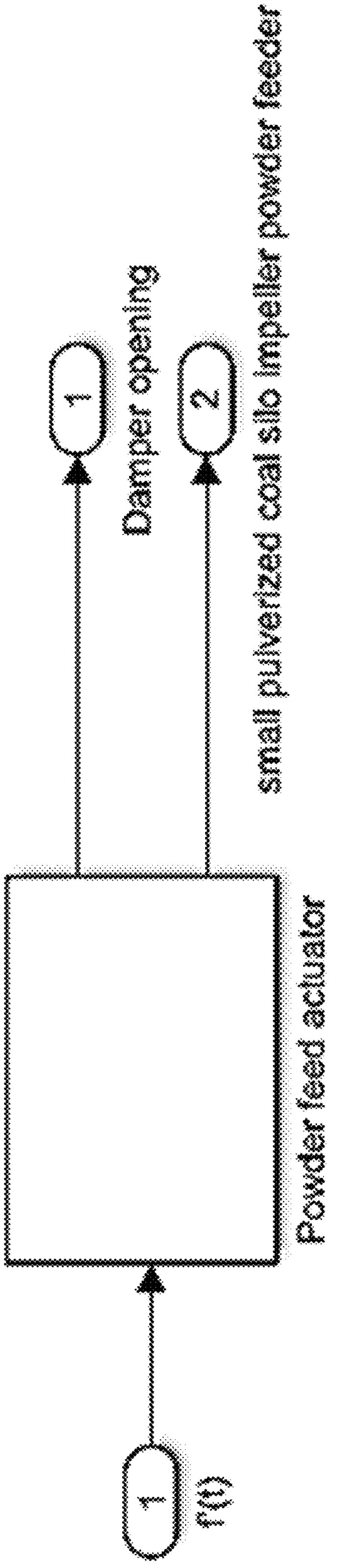
FIG. 7 is a schematic diagram of the coal feeding control process of the small pulverized coal silo involved in the application example of the present invention.

Step 5: Control the small pulverized coal silo to feed coal to the boiler according to the coal feeding control signal f(t), quickly changing the combustion rate in the furnace and increasing the boiler load. FIG. 7 shows a schematic diagram of the coal feeding control process of the small pulverized coal silo.

Calculate the fuel quantity and coal transport air quantity of the small pulverized coal silo based on the coal feeding control signal f(t), and introduce the fuel quantity signal of the small pulverized coal silo into the boiler feedwater control subsystem, and introduce the coal transport air quantity signal into the boiler air supply control subsystem, ensuring that the boiler maintains an appropriate water-coal ratio and air-coal ratio when supplying water and air, even when the small pulverized coal silo is feeding coal.

The coal feeding control signal f(t) controls the coal feeding of the small pulverized coal silo impeller feeder (real-time adjustment of the small pulverized coal silo impeller feeder speed, controlling the amount of fuel entering the boiler as needed), and generates a fuel quantity signal introduced into the boiler feedwater control subsystem. On the other hand, it controls the coal transport air door opening to control the coal transport air quantity through the air-coal cross-limitation control and generates an air quantity signal introduced into the boiler air supply control subsystem. FIG. 8 shows a schematic diagram of the small pulverized coal silo coal feeding control system.

The small pulverized coal silo includes a small pulverized coal silo fuel control unit and a small pulverized coal silo air supply control unit; the small pulverized coal silo fuel control unit is relatively independent from the boiler feedwater control subsystem but is also coupled with it; the small pulverized coal silo air supply control unit is relatively independent from the boiler air supply and induced draft control subsystems but is also coupled with them; the small pulverized coal silo fuel control unit sends the fuel quantity signal of the small pulverized coal silo to the boiler feedwater control subsystem, and the small pulverized coal silo air supply control unit sends the coal transport air quantity signal to the boiler air supply and induced draft control subsystems.

When the small pulverized coal silo is operating, the coupling channel between the small pulverized coal silo fuel control unit and the boiler feedwater control subsystem is open, and the coupling channel between the small pulverized coal silo air supply control unit and the boiler air supply and induced draft control subsystems is open; when the small pulverized coal silo is not operating, the coupling channels between the small pulverized coal silo and the boiler subsystems are all closed, and it does not participate in the boiler combustion process, without affecting the original fuel supply and combustion control process of the boiler. The original system always maintains its normal operation, and the small pulverized coal silo only works to assist in coal feeding in specific situations; there is no situation where the small pulverized coal silo works while the original system's pulverizing, coal feeding, and other equipment do not work.

As shown in FIG. 3, the boiler feedwater control subsystem controls the actual boiler water supply based on the sum of the fuel quantity signal output by the boiler fuel control subsystem and the fuel quantity signal output by the small pulverized coal silo coal feeding control unit; the boiler air supply control subsystem controls the actual boiler air volume based on the fuel quantity signal output by the boiler fuel control subsystem and the coal transport air quantity signal output by the small pulverized coal silo coal feeding control unit.

Compared with the most advanced existing technologies, the present invention can achieve rapid and flexible storage and supply of coal powder, increase the rate of coal powder storage and supply during load increase and decrease, reduce the coal powder supply time by 50%, the system control command response time is <1 s, the system availability is ≥99.9%, and the maximum load change rate that can be achieved is 6% pe/min; the present invention can achieve a rapid increase in the amount of coal powder entering the furnace within 20-30 seconds, and the maximum load change rate that can be achieved is close to 6% pe/min.

The above implementation examples are merely illustrative of the technical solution of the present invention. The coal feeding control method and system for the small pulverized coal silo involved in the present invention are not limited to the content described in the above implementation examples, but are subject to the scope defined by the claims. Any modifications, supplements, or equivalent substitutions made by those skilled in the art within the scope of the present invention based on these implementation examples are within the scope of protection required by the claims of the present invention.

The invention claimed is:

1. A coal feeding control method for a small pulverized coal silo, used in a direct-blow pulverizing system, including the following steps:

Step 1, acquiring a boiler load increase signal to initiate a coal feeding control system of the small pulverized coal silo, and determining a target function F(t) for boiler load control based on the boiler load increase signal, where t is a time series, with a start time of the coal feeding control system as the zero point, and an end time tend is determined by a time interval of the load increase, $t_{end}=\Delta P/\Delta p$, where ΔP is an amount of load increase per event, Δp is a target load increase rate, and F(t) is a time function of a boiler fuel signal;

Step 2, obtaining a current coal mill output signal B(t), which is a fuel quantity signal at an outlet of the coal mill that changes over time from the start time;

Step 3, comparing B(t) with F(t): if B(t) cannot meet the fuel quantity requirements of F(t), then proceed to Steps 4 and 5 to activate the small pulverized coal silo connected to the boiler; otherwise, the small pulverized coal silo remains inactive;

Step 4, determining a coal feeding signal f(t) for the small pulverized coal silo based on the difference between F(t) and B(t), and further determining a coal feeding control signal f(t);

Step 5, controlling the small pulverized coal silo to feed coal to the boiler according to the coal feeding control signal f(t), changing the combustion rate in the furnace, and increasing the boiler load.

2. The coal feeding control method according to claim 1, wherein

In Step 2, a functional relationship between B(t) and t is obtained through pre-tests on the coal mill inlet and outlet output, and B(t) is calculated based on current time and current coal mill signal, coal feeder signal, and primary air flow signal.

3. The coal feeding control method according to claim 1, wherein

In Step 2, B(t) is a piecewise function, with each segment's functional form determined by $c_{m0}+c_{m1}t+c_{m2}t^2+\ldots+c_{mn}t^n$; where a number of segments m and coefficients $c_{m0}$, $c_{m1}$, $c_{m2}\ldots c_{mn}$, as well as a degree n of each segment, are determined through experimentation.

4. The coal feeding control method according to claim 3, wherein

In Step 2, the number of segments m and the coefficients $c_{m0}$, $c_{m1}$, $c_{m2}\ldots c_{mn}$, as well as the degree n of each segment, these undetermined constants are related to coal feeder coal supply, coal mill speed, coal quantity in the coal mill, primary air flow, temperature, pressure difference between the inlet and outlet, and a delay time of the pulverizing system, by changing these parameters to obtain experimental data, values of the undetermined constants are determined by substituting them into B(t), forming an empirical database that associates the coal mill output signal with the current time signals of the coal mill, coal feeder, and primary air flow, by accessing the pre-established database with the current time signal, B(t) can be quickly calculated.

5. The coal feeding control method according to claim 1, wherein

In Step 4, f(t) is revised to obtain f(t); revision objectives include: ensuring that a primary coal pipe velocity is sufficient to prevent blockages and meets an air-fuel ratio, preventing dedicated burners for the small pulverized coal silo from being extinguished or burning burner tips, ensuring that the feeder can achieve and adapt to a coal feeding rate of f(t);

The revision process is as follows: based on f(t), calculate the primary coal pipe velocity, determine the operating state of the dedicated burners for the small pulverized coal silo, and generate a revision factor $\mu$; obtain the feeder's rotation speed, determine the working state of the feeder, and generate a revision factor $\lambda$; obtain a boiler's combustion state, including boiler load, boiler water wall temperature, and content of $O_2$, $SO_2$, $NO_x$, CO in the boiler, and generate a revision factor $\psi$; then, obtain a small pulverized coal silo coal feeding control signal $f(t)=\mu\lambda\psi f(t)$, and determine a final executable coal feeding rate for the small pulverized coal silo based on f(t).

6. The coal feeding control method according to claim 1, wherein

Both f(t) and f(t) are functions that first increase and then decrease, with a coal feeding amount from the small pulverized coal silo first increasing and then gradually decreasing; when the coal mill output signal B(t) can meet a target load change rate or when a load increase process is completed, the output of the small pulverized coal silo becomes zero, and the small pulverized coal silo stops feeding coal, waiting to receive a next load increase command.

7. The coal feeding control method according to claim 1, wherein

In Step 5, the coal quantity and coal transport air quantity of the small pulverized coal silo are calculated based on the coal feeding control signal f(t), and a coal quantity signal of the small pulverized coal silo is introduced into a boiler feedwater control subsystem, and a coal transport air quantity signal is introduced into a boiler air supply control subsystem, ensuring that the boiler maintains an appropriate water-coal ratio and air-coal ratio when supplying water and air, even when the small pulverized coal silo is feeding coal.

8. The coal feeding control method according to claim 1, wherein

The small pulverized coal silo includes a fuel control unit and an air supply control unit for the small pulverized coal silo;

The fuel control unit of the small pulverized coal silo is independent from a boiler feedwater control subsystem and is also coupled with it;

The air supply control unit of the small pulverized coal silo is relatively-independent from a boiler air supply and induced draft control subsystems and is also coupled with them;

The fuel control unit of the small pulverized coal silo sends a coal quantity signal of the small pulverized coal silo to the boiler feedwater control subsystem, and the air supply control unit sends the coal transport air quantity signal to the boiler air supply and induced draft control subsystems;

When the small pulverized coal silo is operating, a coupling channel between the fuel control unit and the boiler feedwater control subsystem is open, and a coupling channel between the air supply control unit and the boiler air supply and induced draft control subsystems is open; when the small pulverized coal silo is not operating, both the fuel and air supply control units are closed, and coupling channels with boiler subsystems are also closed, not participating in the boiler combustion process.

* * * * *